United States Patent
Akihisa et al.

(10) Patent No.: US 7,882,821 B2
(45) Date of Patent: Feb. 8, 2011

(54) SPARK IGNITION TYPE INTERNAL COMBUSTION ENGINE

(75) Inventors: Daisuke Akihisa, Susono (JP); Daisaku Sawada, Gotemba (JP); Eiichi Kamiyama, Mishima (JP); Yukihiro Nakasaka, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 274 days.

(21) Appl. No.: 12/281,693

(22) PCT Filed: Oct. 1, 2007

(86) PCT No.: PCT/JP2007/069528

§ 371 (c)(1),
(2), (4) Date: Sep. 4, 2008

(87) PCT Pub. No.: WO2008/056494

PCT Pub. Date: May 15, 2008

(65) Prior Publication Data

US 2009/0012700 A1    Jan. 8, 2009

(30) Foreign Application Priority Data

Nov. 10, 2006  (JP) .............................. 2006-305160

(51) Int. Cl.
*F02D 13/00* (2006.01)
*F02D 13/04* (2006.01)
(52) U.S. Cl. .................. 123/347; 123/321; 123/348
(58) Field of Classification Search ......... 703/103–105; 123/321, 322, 345–348, 90.1, 90.15–90.17
See application file for complete search history.

(56) References Cited

U.S. PATENT DOCUMENTS

| | | | |
|---|---|---|---|
| 5,857,437 A | 1/1999 | Yoshioka | |
| 2004/0112310 A1 | 6/2004 | Osamura et al. | |
| 2006/0070605 A1 | 4/2006 | Akihisa et al. | |
| 2010/0131170 A1* | 5/2010 | Nakasaka et al. | 701/102 |
| 2010/0180869 A1* | 7/2010 | Akihisa et al. | 123/48 C |

FOREIGN PATENT DOCUMENTS

| | | |
|---|---|---|
| DE | 199 08 454 | 9/1999 |
| EP | 1 431 559 | 6/2004 |
| JP | 55 87833 | 7/1980 |
| JP | 62 60934 | 3/1987 |
| JP | 3 82845 | 8/1991 |
| JP | 4 86338 | 3/1992 |
| JP | 2000 170558 | 6/2000 |
| JP | 2004 218522 | 8/2004 |

* cited by examiner

*Primary Examiner*—John T Kwon
(74) *Attorney, Agent, or Firm*—Oblon, Spivak, McClelland, Maier & Neustadt, L.L.P.

(57) ABSTRACT

An engine provided with a variable timing mechanism (B) able to control a closing timing of an intake valve (7) and a variable compression ratio mechanism (A) able to change a mechanical compression ratio and controlling the closing timing of the intake valve (7) to control the amount of intake air fed into a combustion chamber (5). To obtain an output torque in accordance with the required torque even when the atmospheric pressure changes, when the atmospheric pressure falls, the closing timing of the intake valve (7) is made to approach intake bottom dead center and the mechanical compression ratio is reduced.

19 Claims, 16 Drawing Sheets

FIG.2
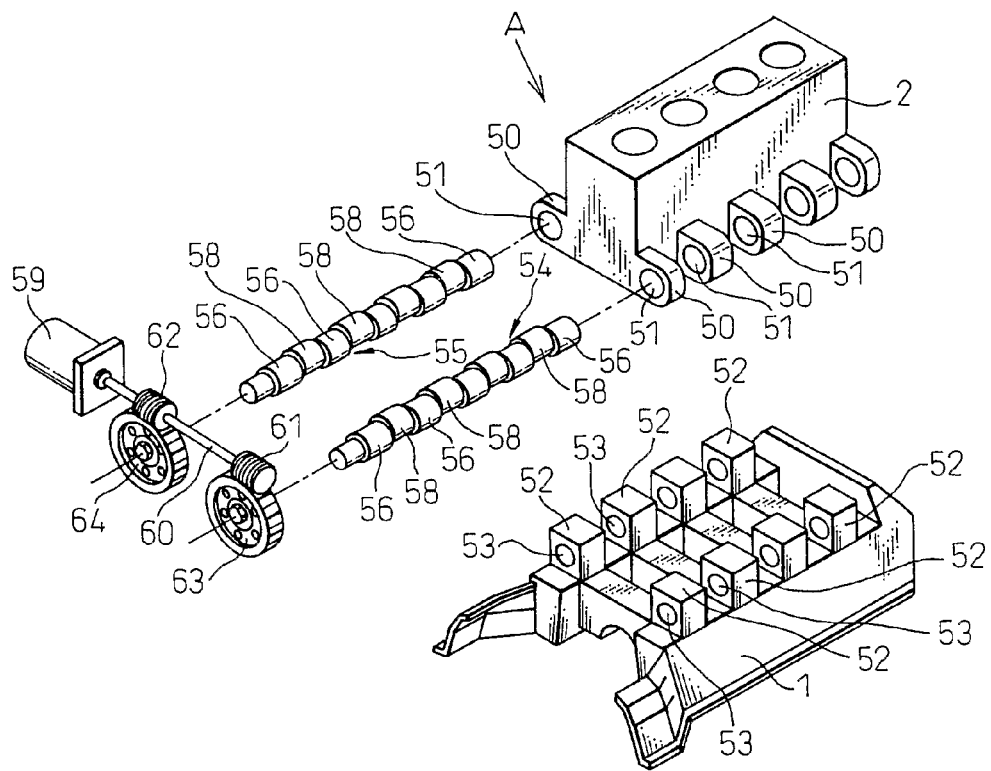
FIG.3
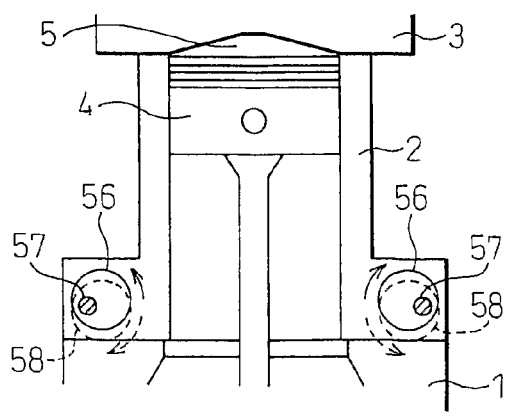
(A)
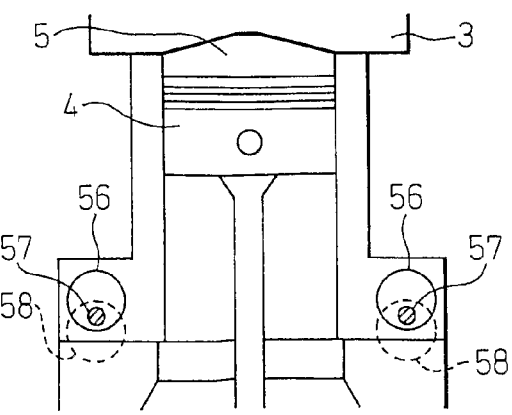
(B)

FIG.6
(A)
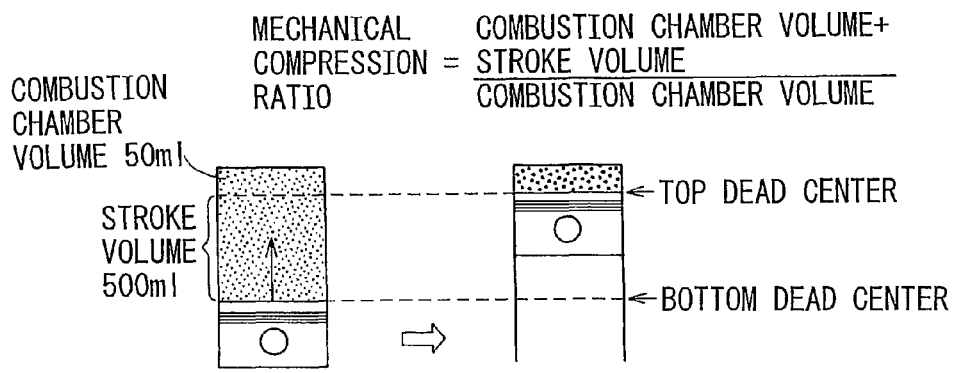
(B)
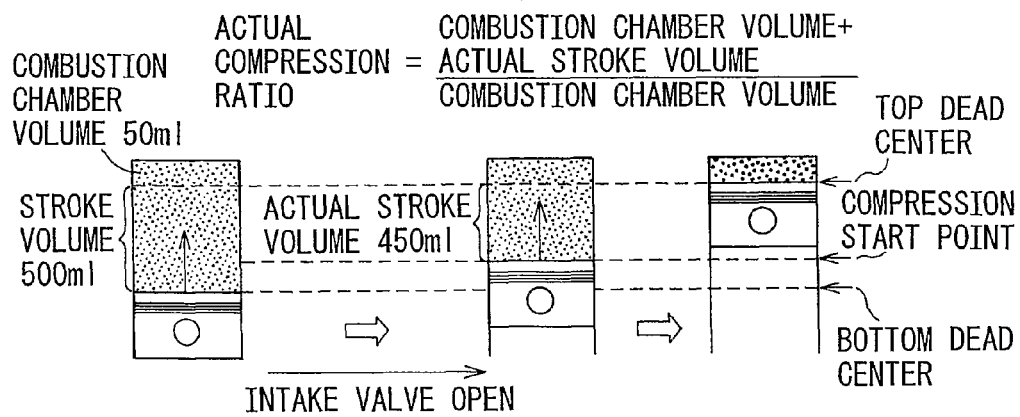
(C)
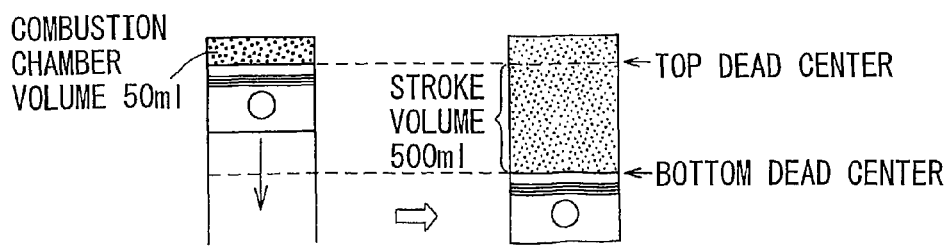

FIG.10
(A)
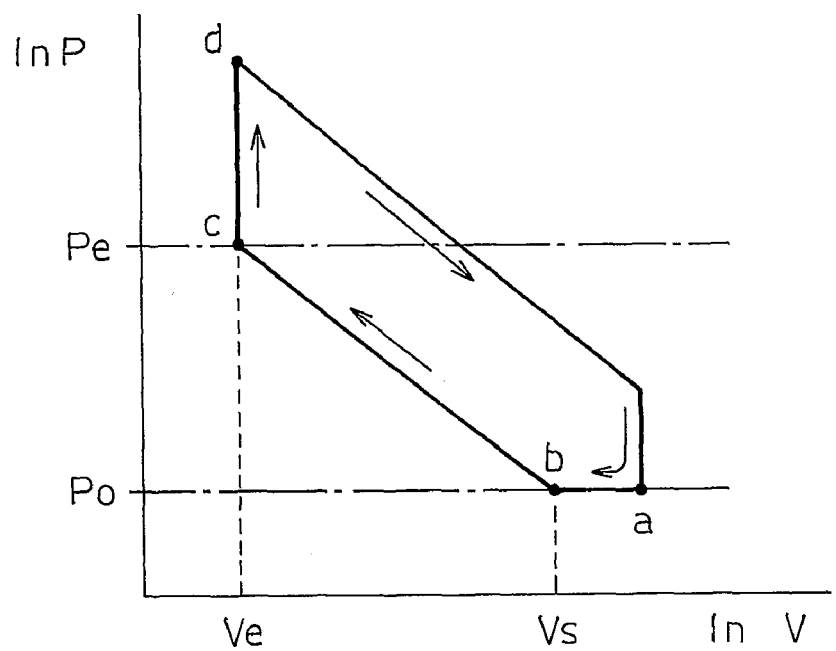
(B)
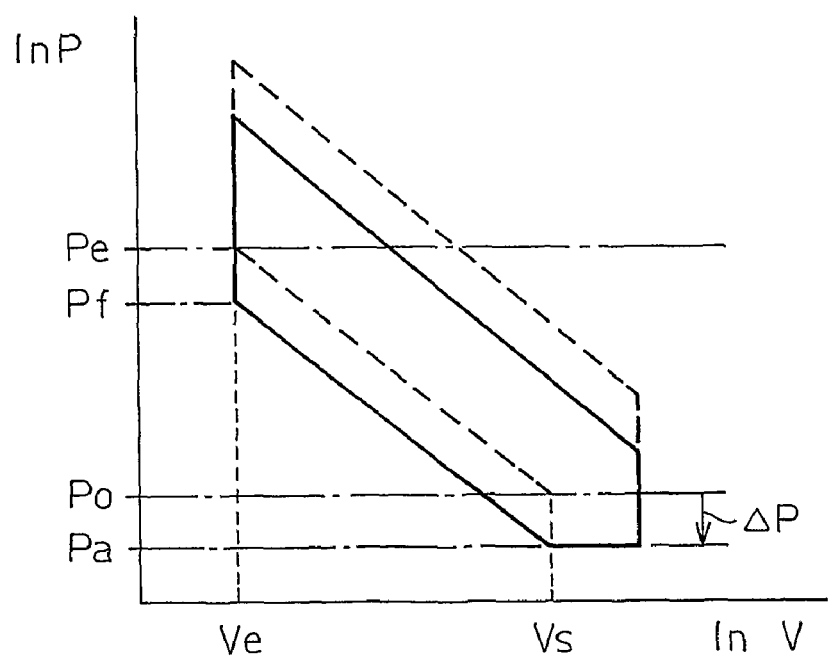

FIG.11
(A)
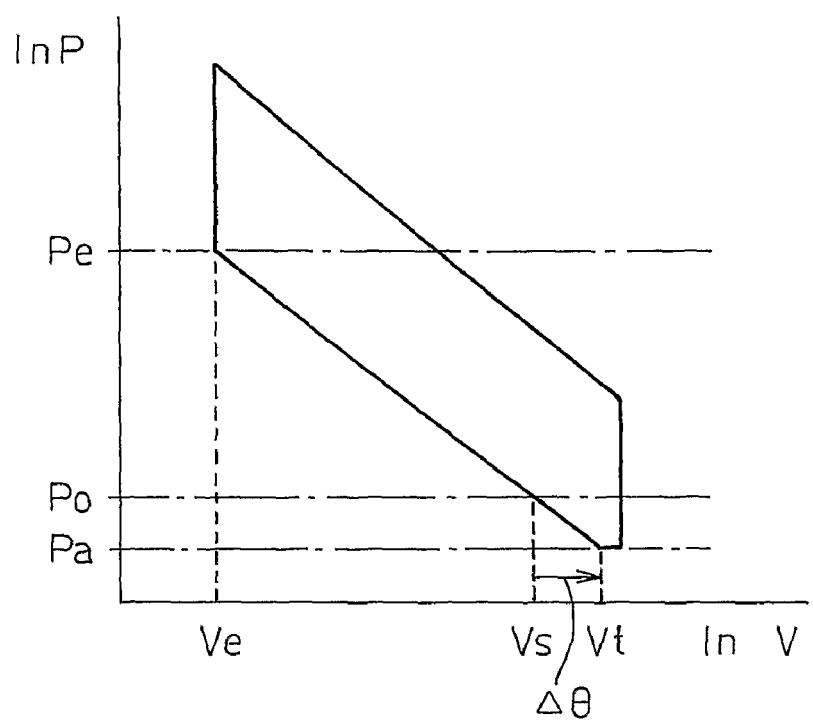
(B)
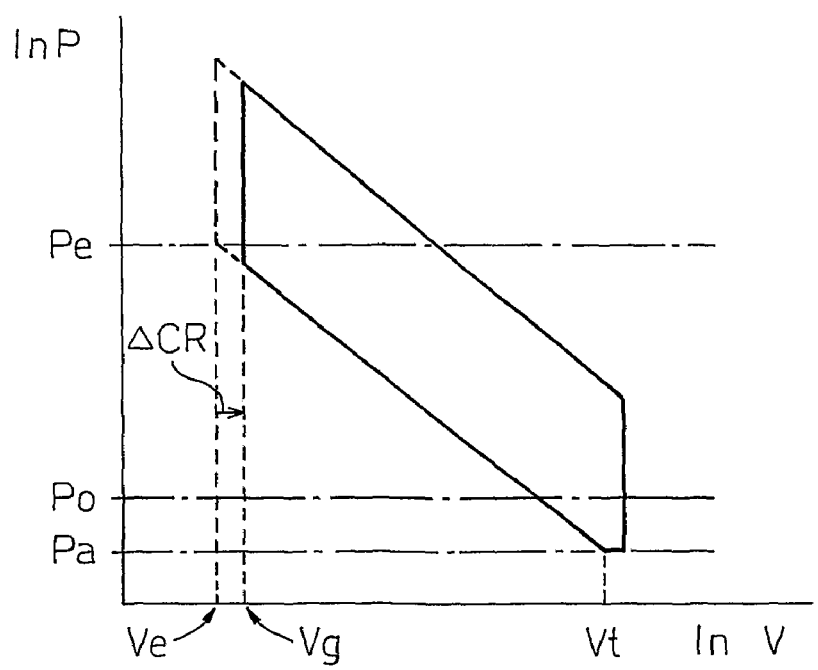

FIG.15
(A)
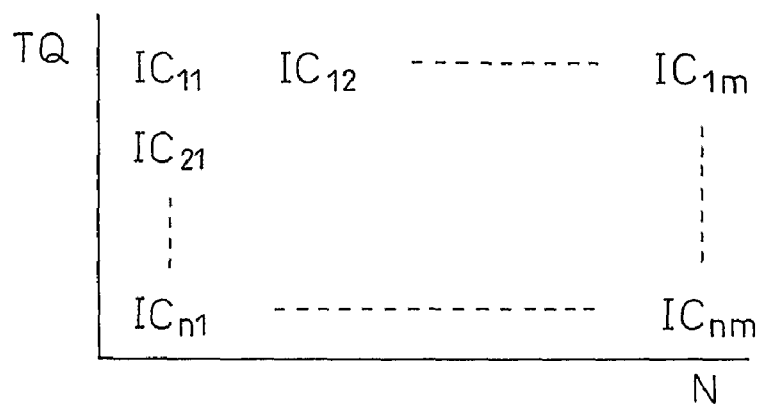
(B)
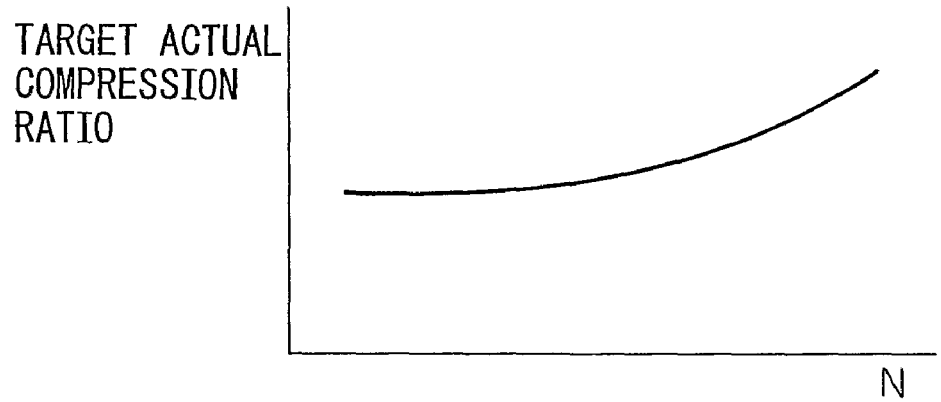
(C)
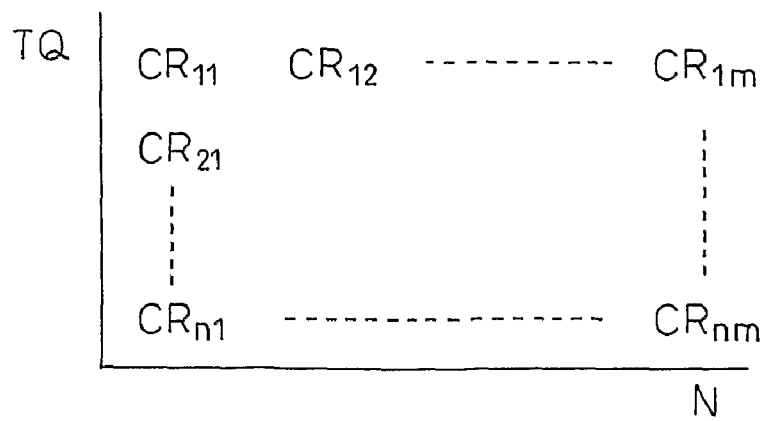

FIG.16
(A)
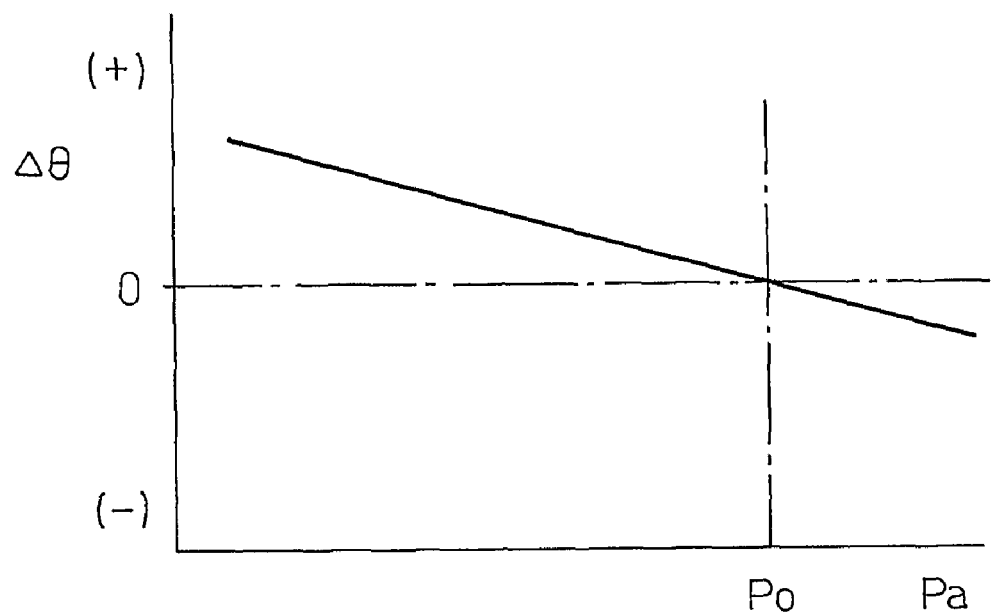
(B)
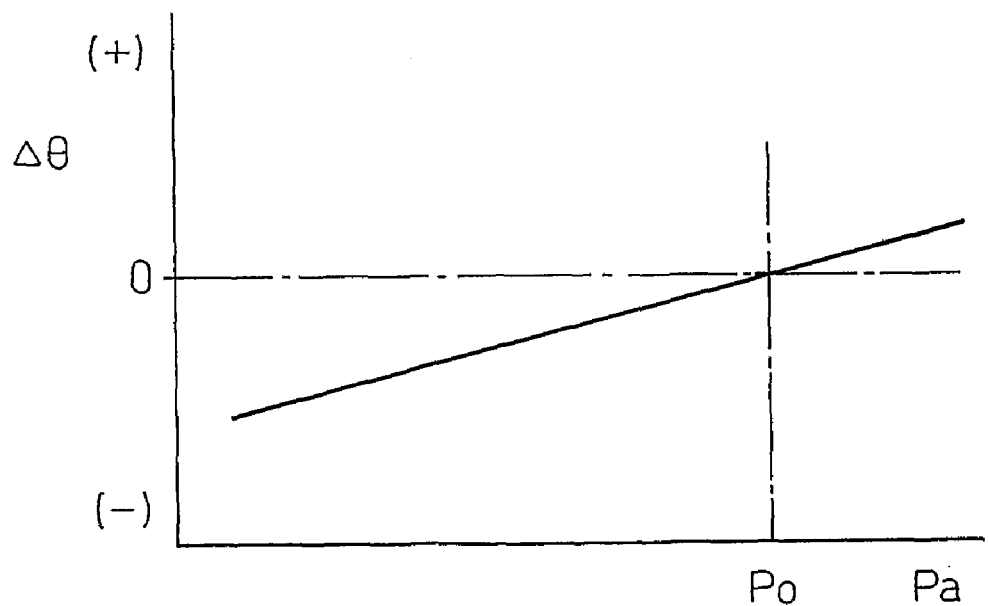

FIG.17
(A)
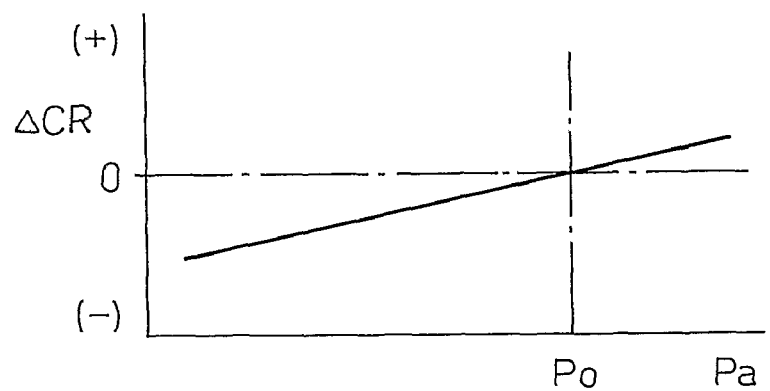
(B)
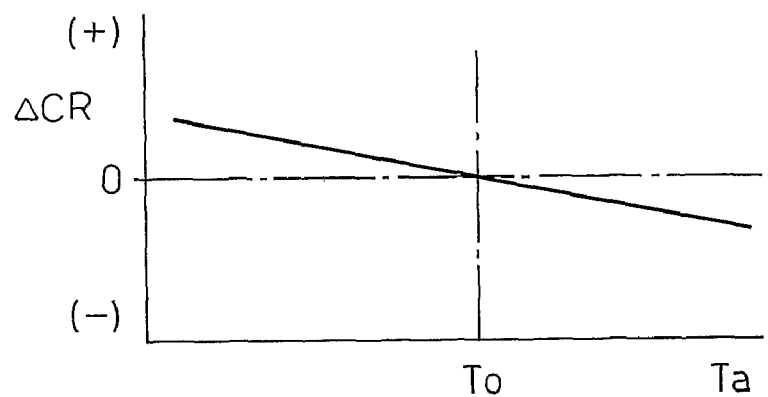
(C)
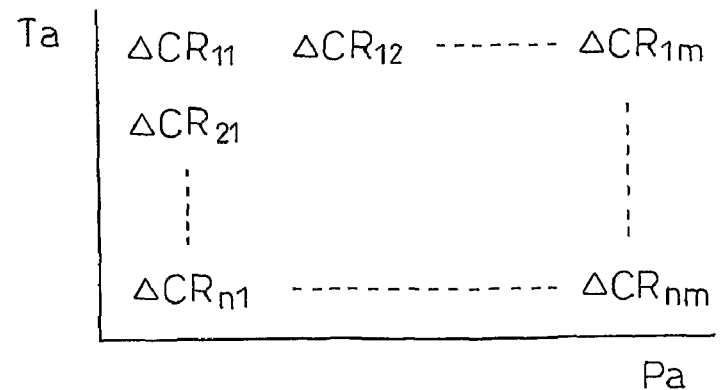

SPARK IGNITION TYPE INTERNAL COMBUSTION ENGINE

TECHNICAL FIELD

The present invention relates to a spark ignition type internal combustion engine.

BACKGROUND ART

Known in the art is a diesel engine arranging a control valve at the top face of each combustion chamber in addition to an intake valve and exhaust valve and provided with a control means for opening this control valve at the time of start of the compression stroke and closing it in the middle of the compression stroke (see Japanese Patent Publication (A) No. 4-86338). In this diesel engine, even if the compression stroke is started, while the control valve is open, the intake air in the combustion chamber is exhausted through the control valve, so no compression action is performed. The compression action is started when the control valve closes. Therefore, in this diesel engine, the closing timing of the control valve is controlled to control the compression ratio.

Note that, in this diesel engine, by controlling the closing timing of the control valve, the lower the atmospheric pressure, the higher the compression ratio is made, while the lower the atmospheric temperature, the higher the compression ratio is made.

On the other hand, in a spark ignition type internal combustion engine, the output torque of the engine is determined by the amount of intake air. In this case, by controlling the closing timing of the intake valve, it is possible to control the amount of intake air in the control combustion chamber. That is, even if the compression stroke has started, while the intake valve is open, the intake air in the combustion chamber is exhausted through the intake valve into the intake port, so the amount of intake air actually fed into the combustion chamber becomes the amount of intake air sealed in the combustion chamber when the intake valve closes. Therefore, by controlling the closing timing of the intake valve, the amount of intake air of the combustion chamber can be controlled.

In this regard, in an internal combustion engine, the output torque required in accordance with the operating state of the engine is preferably generated even if the atmospheric pressure changes. For this reason, the mass of the intake air fed into the combustion chamber has to be maintained the same even if the atmospheric pressure changes. Therefore, for example, if the atmospheric pressure falls, the density of the intake air will become lower, so the volume of the intake air fed into the combustion chamber will have to be increased. Therefore, when trying to close the intake valve after intake bottom dead center, at this time it is necessary to advance the closing timing of the intake valve.

In this regard, if advancing the closing timing of the intake valve, the compression ratio will become higher, so if for example assuming the atmospheric temperature is the same, the compression end temperature will end up becoming extremely high. On the other hand, in this case, to lower the compression end temperature, the closing timing of the intake valve may be delayed, but if delaying the closing timing of the intake valve, this time the amount of intake air will be reduced and consequently the output torque will end up becoming lower than the required torque.

In the above-mentioned known diesel engine, by controlling the closing timing of the control valve, the compression ratio is controlled to the target compression ratio in accordance with the atmospheric pressure and atmospheric temperature. That is, the compression end pressure and compression end temperature are controlled to the compression end pressure and compression end temperature suited for compression ignition combustion. However, when controlling the closing timing of the intake valve to control the amount of intake air fed to the combustion chamber, even if the compression end temperature becomes extremely high, the closing timing of the intake valve cannot be delayed to obtain an output torque in accordance with the required torque. To control the compression end temperature, still other control different from that of the above-mentioned diesel engine becomes required.

DISCLOSURE OF THE INVENTION

An object of the present invention is to provide a spark ignition type internal combustion engine able to control the compression end temperature to an optimum temperature.

According to the present invention, there is provided a spark ignition type internal combustion engine provided with a variable timing mechanism able to control a closing timing of an intake valve and a variable compression ratio mechanism able to change a mechanical compression ratio and controlling the closing timing of the intake valve to control the amount of intake air fed into a combustion chamber, wherein the closing timing of the intake valve is caused to approach intake bottom dead center when the atmospheric pressure falls and the mechanical compression ratio is reduced when the atmospheric pressure falls or the atmospheric temperature rises so that an output torque in accordance with a required torque can be obtained even when the atmospheric pressure changes.

BRIEF DESCRIPTION OF THE DRAWINGS

FIG. 2 is a disassembled perspective view of a variable compression ratio mechanism.

FIG. 3 is a side cross-sectional view of the illustrated internal combustion engine.

FIG. 6 is a view for explaining the engine compression ratio, actual compression ratio, and expansion ratio.

FIG. 10 is a view showing a PV diagram.

FIG. 11 is a view showing a PV diagram.

FIG. 15 is a view showing a map of a reference closing timing IC of an intake valve, etc.

FIG. 16 is a view showing a correction amount $\Delta\theta$ for the closing timing of the intake valve.

FIG. 17 is a view showing a correction amount $\Delta CR$ for the mechanical compression ratio.

BEST MODE FOR CARRYING OUT THE INVENTION

Figure 1:
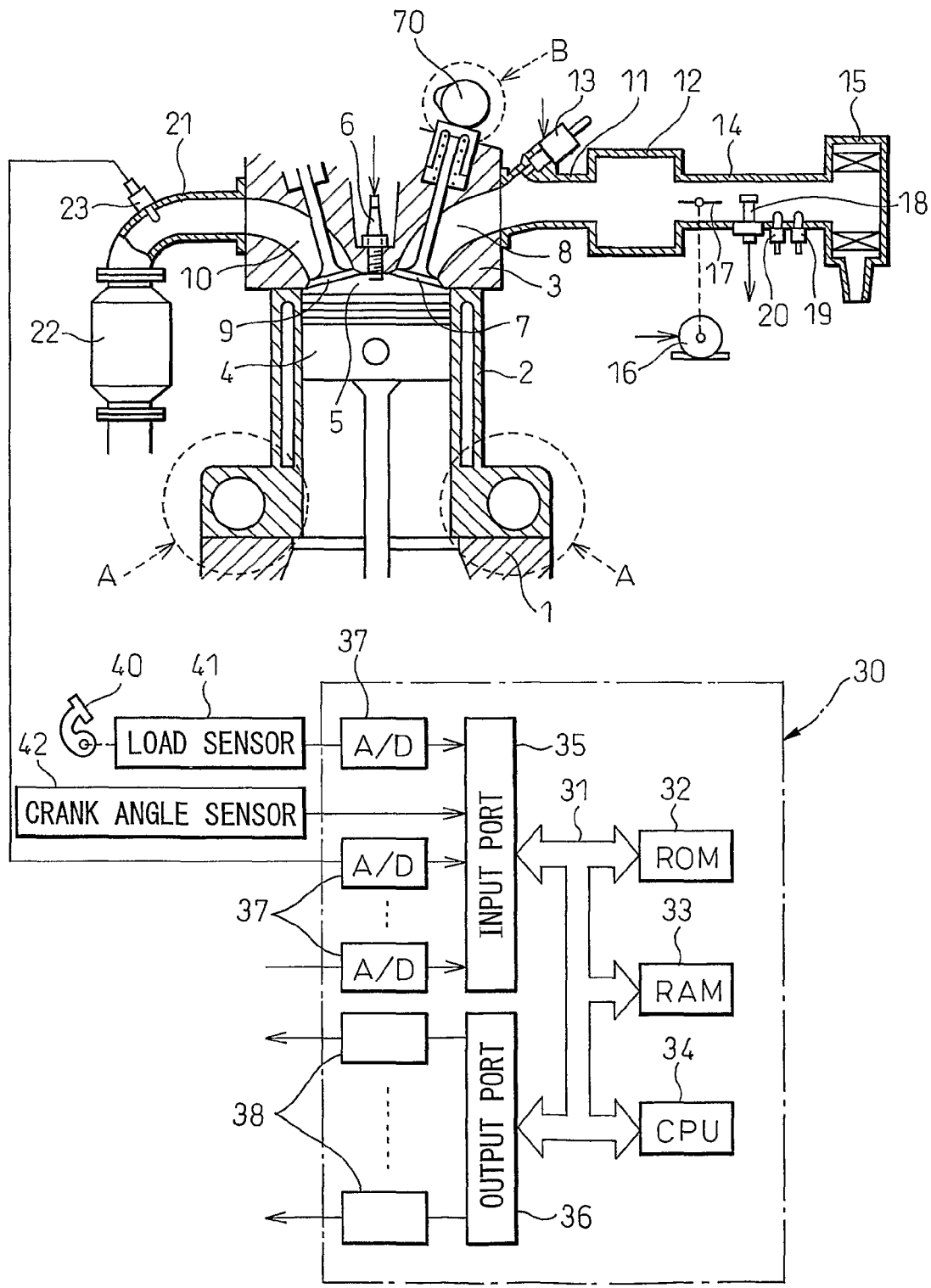
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16, an intake air amount detector 18 using for example a hot wire, an atmospheric pressure sensor 19 for detecting an atmospheric pressure and an atmospheric temperature sensor 20 for detecting an atmospheric temperature. On the other hand, the exhaust port 10 is connected through an exhaust manifold 21 to a catalytic converter 22 housing for example a three-way catalyst, while the exhaust manifold 21 is provided inside it with an air-fuel ratio sensor 23.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signals of the intake air amount detector 18, the atmospheric pressure sensor 19, the atmospheric temperature sensor 20 and the air-fuel ratio sensor 23 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
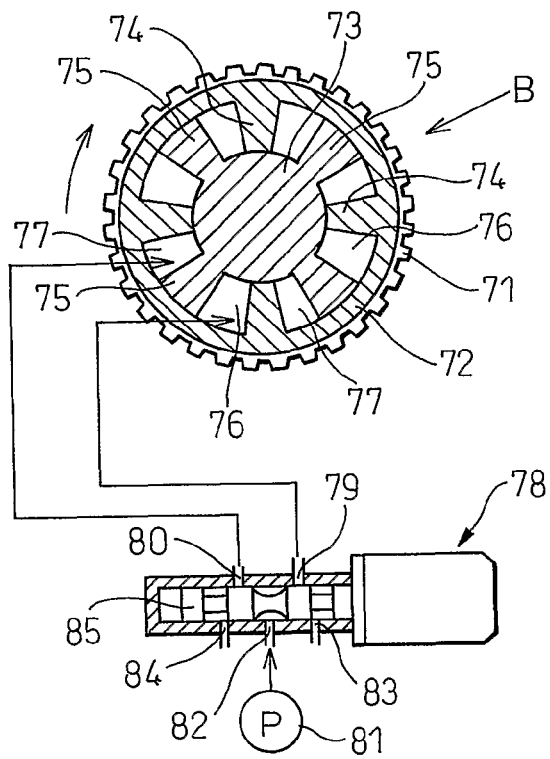
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
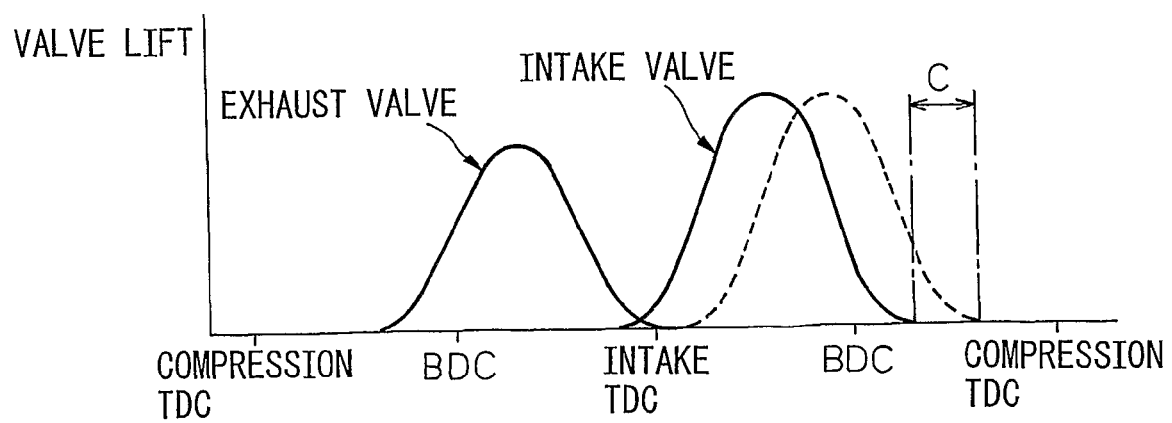
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 6. Note that FIG. 6(A), (B), and (C) show for explanatory purposes an engine with a volume of the combustion chambers of 50 ml and a stroke volume of the piston of 500 ml. In these FIG. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the superhigh expansion ratio cycle used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIG. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
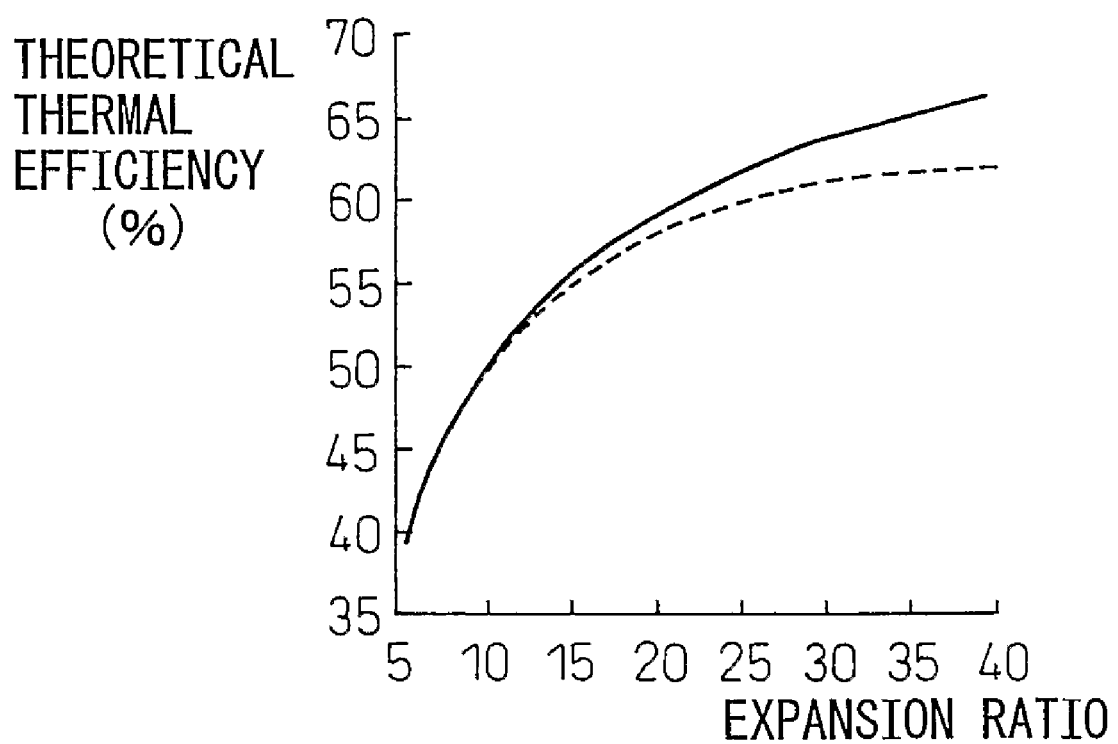
FIG. 7 is a view showing the relationship between the theoretical thermal efficiency and expansion ratio.
Figure 8:
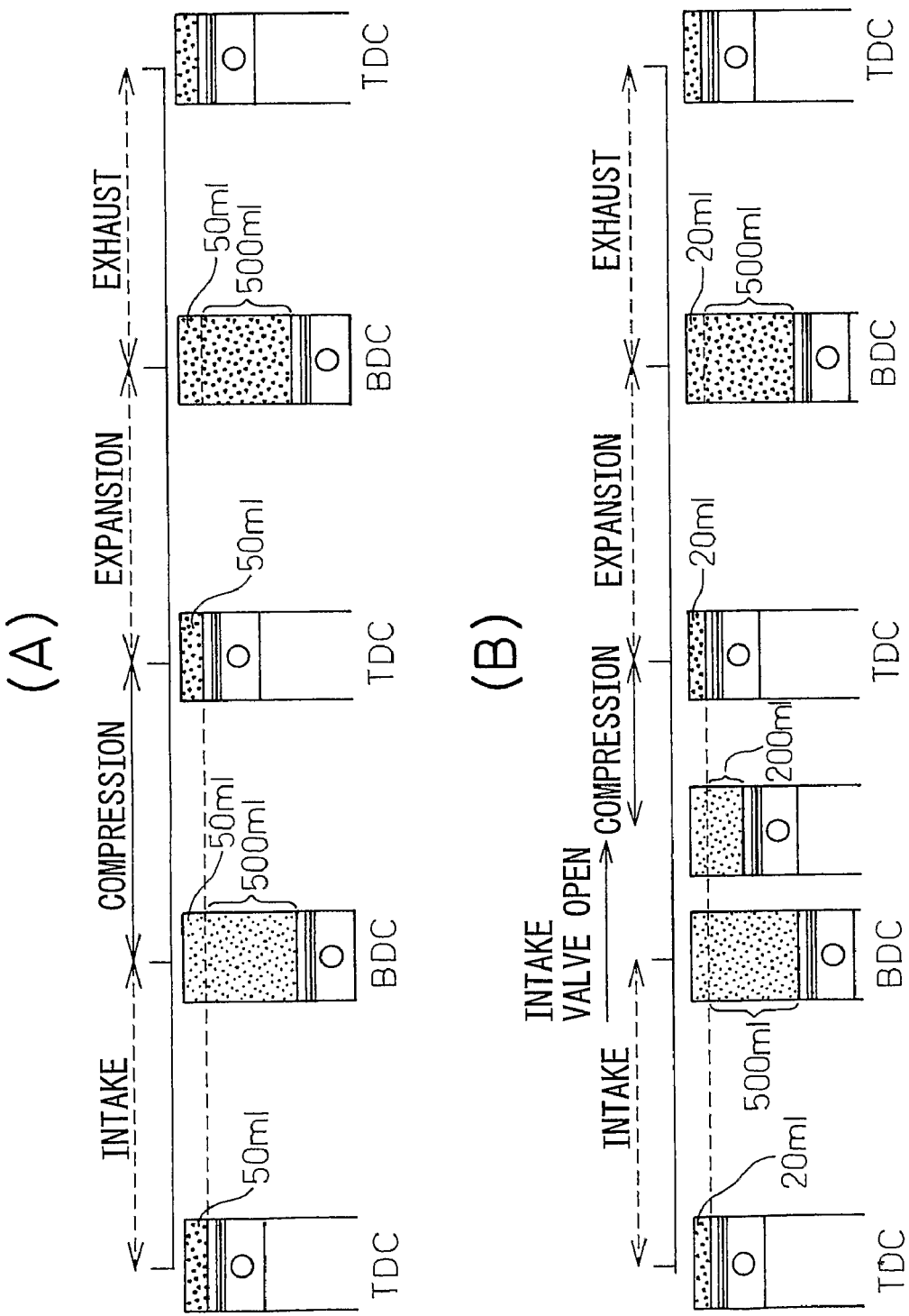
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set.

Next, the operational control as a whole will be roughly explained with reference to FIG. 9.

Figure 9:
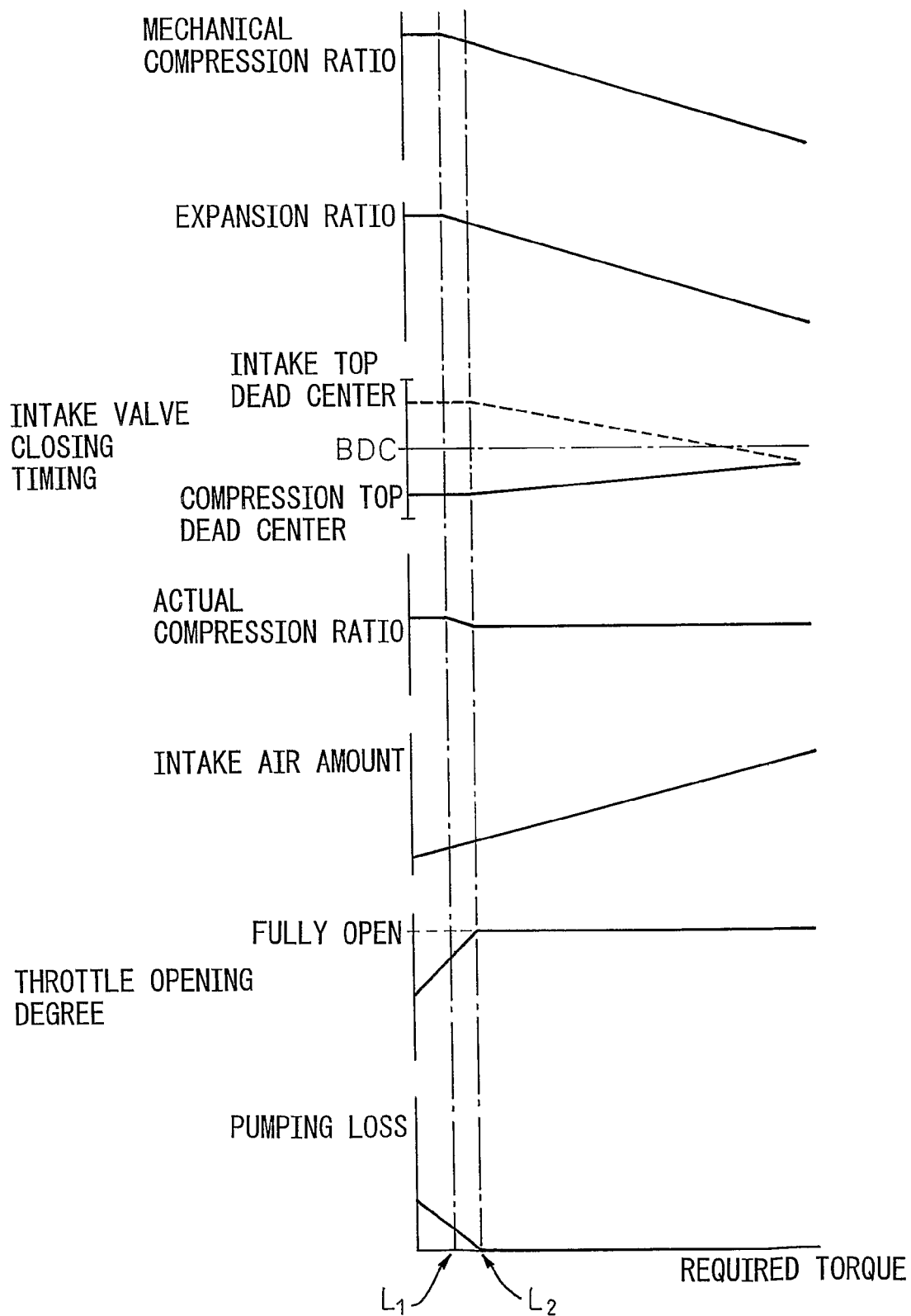
FIG. 9 is a view showing the change in mechanical compression ratio etc. in accordance with the required torque.

FIG. 9 shows the changes in the mechanical compression ratio, expansion ratio, closing timing of the intake valve 7, actual compression ratio, the amount of intake air, opening degree of the throttle valve 17, and pumping loss along with the required torque. Note that FIG. 9 illustrates the case where the atmospheric pressure is a standard atmospheric pressure, for example, 980 mbar and the atmospheric temperature is a standard atmospheric temperature, for example, 0° C. In addition, in the embodiment according to the present invention, ordinarily the average air-fuel ratio in the combustion chamber 5 is feedback controlled to the stoichiometric air-fuel ratio based on the output signal of the air-fuel ratio sensor 23 so that the three-way catalyst in the catalytic converter 22 can simultaneously reduce the unburned HC, CO, and $NO_X$ in the exhaust gas.

Now, as explained above, at the time of engine high load operation, i.e., when the required torque is high, the ordinary cycle shown in FIG. 8(A) is executed. Therefore, as shown in FIG. 9, at this time, since the mechanical compression ratio is made low, the expansion ratio becomes low, and as shown by the solid line in low in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown in FIG. 9, along with the reduction in the engine load, the mechanical compression ratio is increased, therefore the expansion ratio is also increased. Further, at this time, the closing timing of the intake valve 7 is delayed as the required torque becomes lower as shown by the solid line in FIG. 9 so that the actual compression ratio is held substantially constant. Note that at this time as well, the throttle valve 17 is held at the fully opened or substantially fully opened state. Therefore the amount of intake air fed to the combustion chamber 5 is controlled not by the throttle valve 17, but by changing the closing timing of the intake valve 7. At this time as well, the pumping loss becomes zero.

In this way when the required torque becomes lower from the engine high load operating state, the mechanical compression ratio is increased along with the fall in the amount of intake air under a substantially constant actual compression ratio. That is, the volume of the combustion chamber 5 when the piston 4 reaches compression top dead center is reduced proportionally to the reduction in the amount of intake air. Therefore the volume of the combustion chamber 5 when the piston 4 reaches compression top dead center changes proportionally to the amount of intake air. Note that at this time, the air-fuel ratio in the combustion chamber 5 becomes the stoichiometric air-fuel ratio, so the volume of the combustion chamber 5 when the piston 4 reaches compression top dead center changes proportionally to the amount of fuel.

If the required torque becomes further lower, the mechanical compression ratio is further increased. When the mechanical compression ratio reaches the limit mechanical compression ratio forming the structural limit of the combustion chamber 5, in the region of a load lower than the engine load $L_1$ when the mechanical compression ratio reaches the limit mechanical compression ratio, the mechanical compression ratio is held at the limit engine compression ratio. Therefore when the required torque is low, i.e., at the time of engine low load operation, the mechanical compression ratio becomes maximum, and the expansion ratio also becomes maximum. Putting this another way, so as to obtain the maximum expansion ratio at the time of engine low load operation, the mechanical compression ratio is made maximum. Further, at this time, the actual compression ratio is maintained at an actual compression ratio substantially the same as that at the time of engine medium and high load operation.

On the other hand, as shown by the solid line in FIG. 9, the closing timing of the intake valve 7 is delayed to the limit closing timing enabling control of the amount of intake air fed to the combustion chamber 5 as the required torque becomes lower. In the region of a required torque lower than the required torque $L_2$ when the closing timing of the intake valve 7 reaches the limit closing timing, the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 9, at this time, that is, in the region of a required torque lower than the required torque $L_2$ when the closing timing of the intake valve 7 reaches the limit closing timing, the throttle valve 17 is used to control the amount of intake air fed to the combustion chamber 5. However, if using the throttle valve 17 to control the amount of intake air, as shown in FIG. 9, the pumping loss increases.

Note that to prevent this pumping loss, in the region of a required torque lower than the required torque $L_2$ when the closing timing of the intake valve 7 reaches the limit closing timing, the throttle valve 17 is held in the fully opened or substantially fully opened. In that state, the lower the engine load, the larger the air-fuel ratio may be made. At this time, the fuel injector 13 is preferably arranged in the combustion chamber 5 to perform stratified combustion.

On the other hand, as explained above, in the superhigh expansion ratio cycle shown in FIG. 8(B), the expansion ratio is made 26. The higher this expansion ratio, the better, but if 20 or more, a considerably high theoretical thermal efficiency can be obtained. Therefore, in the present invention, the variable compression ratio mechanism A is formed so that the expansion ratio becomes 20 or more. Further, in the example shown in FIG. 9, the mechanical compression ratio is changed continuously in accordance with the required torque. However, the mechanical compression ratio can also be changed in stages in accordance with the required torque.

On the other hand, as shown by the broken line in FIG. 9, as the required torque becomes lower, by advancing the closing timing of the intake valve 7 as well, it is possible to control the amount of intake air without depending on the throttle valve 17. Therefore, in FIG. 9, if comprehensively expressing both the case shown by the solid line and the case shown by the broken line, in the embodiment according to the present invention, the closing timing of the intake valve 7 is shifted as the required torque becomes lower in a direction away from compression bottom dead center BDC until the limit closing timing $L_2$ enabling control of the amount of intake air fed into the combustion chamber.

Now, in an embodiment according to the present invention, the required value of the output torque of the engine, that is, the required torque, is predetermined in accordance with the operating state of the engine determined by the amount of depression of the accelerator pedal 40, the engine speed, etc. The engine is controlled so that an output torque required in accordance with the operating state of the engine is generated even if the atmospheric pressure changes from the reference atmospheric pressure.

In this regard, in an embodiment according to the present invention, as explained above, the output torque is determined by the mass of the intake air fed into the combustion chamber 5. Therefore, in an embodiment according to the present invention, the engine is controlled so that even if the atmospheric pressure changes from the reference atmospheric pressure, the mass of the intake air fed into the combustion chamber 5 becomes the same as the mass of the intake air at the time of the reference atmospheric pressure. Therefore, for example, when the atmospheric pressure falls, the density of the intake air becomes lower, so the volume of the intake air fed into the combustion chamber 5 must be increased. Therefore, as shown by the solid line in FIG. 9, when the intake valve 7 is closed after intake bottom dead center, the closing timing of the intake valve 7 is advanced.

However, if advancing the closing timing of the intake valve 7 in this way, the compression ratio will become higher, so assuming for example that the atmospheric temperature is the same, the compression end temperature would end up becoming extremely high. Therefore, in the present invention, at this time, the mechanical compression ratio is lowered so that the compression end temperature will not become excessively high. Next, this will be explained with reference to FIG. 10 to FIG. 12.

FIG. 10(A) shows the relationship between the volume V of the combustion chamber 5 and the pressure P in the combustion chamber 5, when the atmospheric pressure is the reference atmospheric pressure and the atmospheric temperature is the reference atmospheric temperature. Note that in FIG. 10(A), both the pressure P of the ordinate and the volume V of the abscissa are expressed as logarithms. The same is true for FIG. 10(B) and FIGS. 11(A),(B).

In FIG. 10(A), the point a shows exhaust bottom dead center and intake bottom dead center, while the point b shows the closing timing of the intake valve 7 in the case where the intake valve 7 is closed after intake bottom dead center. In the interval from exhaust bottom dead center a to intake bottom dead center a and in the interval from intake bottom dead center a to the closing timing b of the intake valve 7, the pressure P in the combustion chamber 5 becomes the reference atmospheric pressure Po. Next, when the compression stroke proceeds, the pressure P in the combustion chamber 5 rises. When the piston 4 reaches top dead center c, the pressure P in the combustion chamber 5 becomes the compression end pressure Pe. Next, when combustion is performed, the pressure P in the combustion chamber 5 rises to the point d. Next, when the piston 4 falls, until the exhaust action is started, the pressure P in the combustion chamber 5 gradually falls.

Now, for example, if the vehicle is used at a high altitude, the atmospheric pressure P falls from the reference atmospheric pressure Po to the atmospheric pressure Pa by exactly $\Delta P$. If, at this time, the intake valve 7 is closed at the same timing as FIG. 10(A), the volume V of the combustion chamber 5 and the pressure P in the combustion chamber 5 change as shown in FIG. 10(B). As will be understood from FIG. 10(B), at this time, the compression end pressure falls from the Pe to the Pf shown in FIG. 10(A). This means that the mass of the intake air fed into the combustion chamber 5 has become smaller.

In this case, to make the mass of the intake air fed into the combustion chamber 5 the same as the case shown in FIG. 10(A), the compression end pressure has to be made Pe. Therefore, as shown in FIG. 11(A), the closing timing of the intake valve 7 has to be advanced by exactly $\Delta\theta$ so that the volume V of the combustion chamber 5 when the intake valve 7 opens changes from Vs to Vt. In this regard, if advancing the closing timing of the intake valve 7, the compression start timing will be advanced, so the actual compression ratio will increase. Therefore, at this time, if the atmospheric temperature were the reference atmospheric temperature, the compression end temperature would end up becoming extremely high.

Therefore, in the present invention, to prevent the compression end temperature from becoming extremely high, as shown in FIG. 11(B), the mechanical compression ratio is lowered by exactly $\Delta CR$ so that the volume V of the combustion chamber 5 at compression top dead center is reduced from Ve to Vg. If the mechanical compression ratio is reduced, the actual compression ratio will fall, so the compression end temperature will fall. On the other hand, if the mechanical compression ratio is reduced, as shown in FIG. 11(B), the compression end pressure will fall somewhat compared with the Pe shown in FIG. 10(A), but the mass of the intake air fed into the combustion chamber 5 is the same as the case shown in FIG. 10(A), so the output torque becomes substantially the same as the output torque of the case shown in FIG. 10(A).

Next, the above will be explained from another viewpoint.

Figure 12:
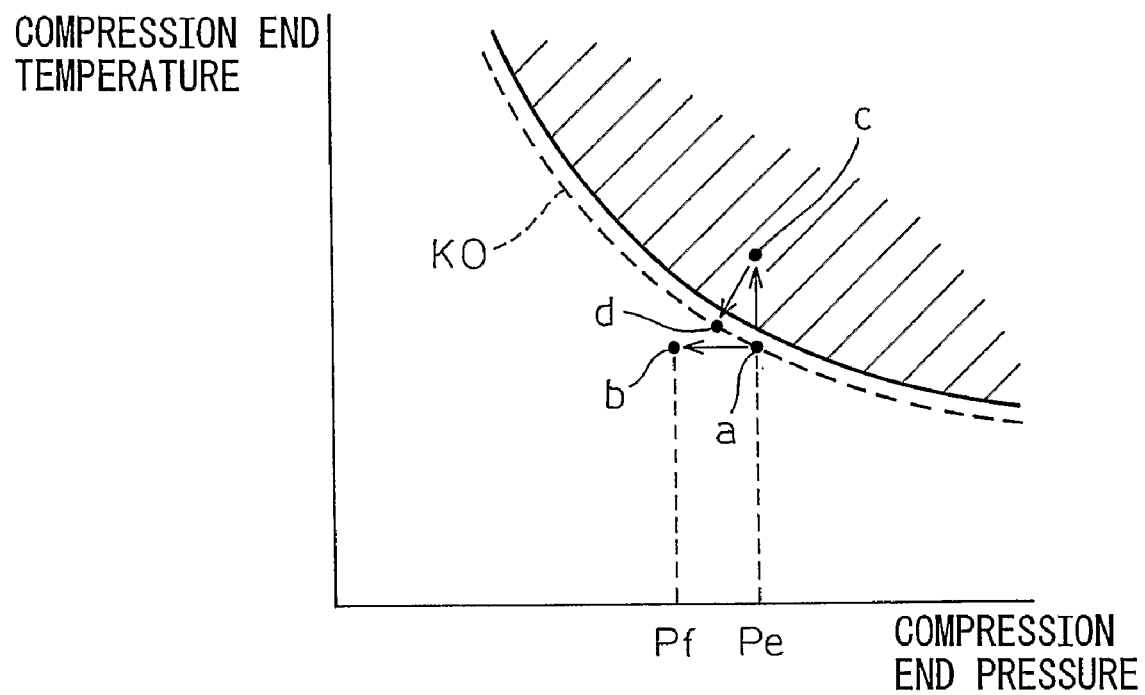
FIG. 12 is a view showing an allowable limit value at which normal combustion can be performed.

FIG. 12 shows the relationship between the compression end pressure and compression end temperature in the combustion chamber 5 and the allowable limit value KO at which normal combustion can be performed. The region shown by the hatching in FIG. 12 shows the region where knocking and other abnormal combustion occurs. The other region shows the region where normal combustion is performed. The allowable limit value KO is positioned inside the normal combustion region extremely close to the region where abnormal combustion is performed. At this allowable limit value KO, the highest heat efficiency is obtained. Therefore, in an embodiment according to the present invention, the closing timing of the intake valve 7 and the mechanical compression ratio are determined so that the compression end pressure and compression end temperature become this allowable limit value.

That is, as shown in FIG. 10(A), the compression end pressure Pe and the compression end temperature when the atmospheric pressure is the reference atmospheric pressure and the atmospheric temperature is the reference atmospheric temperature are shown by the point a of FIG. 12. If the atmospheric temperature is the same and, as shown in FIG. 10(B), the atmospheric pressure falls, the compression end pressure Pf and the compression end temperature at this time will become the point b of FIG. 12. On the other hand, when the atmospheric pressure falls, as shown in FIG. 11(A), if the closing timing of the intake valve 7 is advanced by exactly $\Delta\theta$ and the compression end pressure is made Pe, the compression end pressure Pe and compression end temperature at this time will become the point c of FIG. 12. That is, the compression end temperature and compression end pressure will end up exceeding the allowable limit value KO at which normal combustion can be performed.

Therefore, in the present invention, when the closing timing of the intake valve 7 approaches intake bottom dead center and the compression end temperature and compression end pressure exceed the allowable limit value KO where normal combustion can be performed, the mechanical compression ratio is lowered until the mechanical compression ratio where the compression end temperature and compression end pressure become the allowable limit value KO. The compression end pressure and compression end temperature at this time are shown by the point d in FIG. 12. That is, as will be understood from FIG. 12, if the mechanical compression ratio is reduced, the compression end pressure will fall just slightly, but the compression end temperature will greatly fall.

Figure 13:
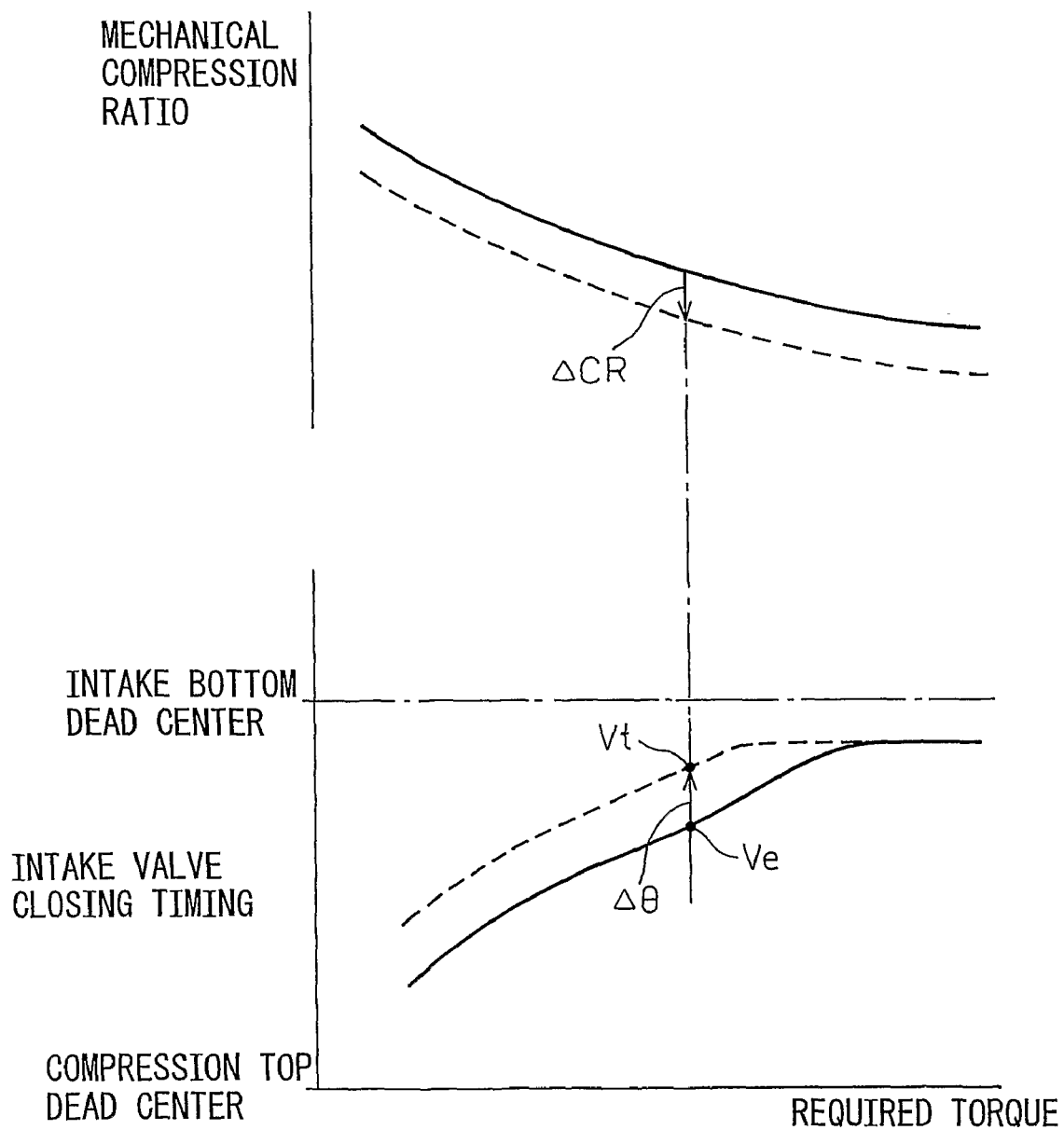
FIG. 13 is a view showing a mechanical compression ratio and closing timing of the intake valve.

Next, referring to FIG. 13 to FIG. 18, an embodiment according to the present invention will be explained in detail. The solid lines in FIG. 13 show the relationship between the mechanical compression ratio shown in FIG. 9 and the required torque and the relationship between the closing timing of the intake valve 7 shown by the solid line in FIG. 9 and the required torque, that is, the relationship between the reference mechanical compression ratio and the required torque and the relationship between the reference closing timing of the intake valve 7 and the required torque when the atmospheric pressure is the reference atmospheric pressure and the atmospheric temperature is the reference atmospheric temperature.

In this regard, the reference closing timing IC of the intake valve 7 required for feeding the amount of intake air able to give the required torque to the inside of the combustion chamber 5 becomes a function of the required torque and engine speed. Therefore, in the embodiment according to the present invention, the reference closing timing IC of the intake valve 7 is stored as a function of the required torque TQ and engine speed N in the form of the map as shown in FIG. 15(A) in advance in the ROM 32. From this map, the reference closing timing of the intake valve 7 shown by the solid line in FIG. 13 is calculated.

On the other hand, as explained before, in the embodiment according to the present invention, at the time of engine low speed operation, regardless of the required torque, the actual compression ratio is held substantially constant. However, if the engine speed rises, turbulence occurs in the air-fuel mixture in the combustion chamber 5, so knocking will not easily occur. Therefore, in the embodiment according to the present invention, as shown in FIG. 15(B), the higher the engine speed N, the higher the target actual compression ratio. On the other hand, the mechanical compression ratio required for making the actual compression ratio this target actual compression ratio becomes a function of the required torque and engine speed. Therefore, in the embodiment according to the present invention, the reference mechanical compression ratio CR required for making the actual compression ratio the target actual compression ratio is stored as a function of the required torque TQ and engine speed N in the form of a map as shown in FIG. 15(C) in advance in the ROM 32. The reference mechanical compression ratio shown by the solid line in FIG. 13 is calculated.

Now, as explained above, in the embodiment according to the present invention, if the atmospheric pressure becomes low, as shown by FIG. 11(A), the closing timing of the intake valve 7 is advanced by exactly $\Delta\theta$ and, as shown in FIG. 11(B), the mechanical compression ratio is lowered by exactly $\Delta CR$. That is, when the atmospheric pressure falls from the reference atmospheric pressure, the closing timing of the intake valve 7 is made to approach the intake bottom dead center by exactly the correction amount $\Delta\theta$ from the reference closing timing shown by the solid line in FIG. 13 to the closing timing shown by the broken line and the mechanical compression ratio is reduced by exactly the correction amount $\Delta CR$ from the reference mechanical compression ratio shown by the solid line in FIG. 13 to the mechanical compression ratio shown by the broken line.

FIG. 16(A) shows the relationship between the correction amount $\Delta\theta$ for the closing timing of the intake valve 7 shown in FIG. 13 and the atmospheric pressure Pa. Note that in FIG. 16(A), Po indicates the reference atmospheric pressure. As will be understood from FIG. 16(A), the correction amount $\Delta\theta$ increases the more the atmospheric pressure Pa falls from the reference atmospheric pressure Po, while becomes negative and falls the more the atmospheric pressure Pa rises from the reference atmospheric pressure Po. That is, if the atmospheric pressure Pa falls from the reference atmospheric pressure Po, the closing timing of the intake valve 7 is made to approach intake top dead center, while if the atmospheric pressure Pa rises from the reference atmospheric pressure Po, the closing timing of the intake valve 7 is made to separate from intake bottom dead center.

On the other hand, FIG. 17(A) shows the relationship between the correction amount $\Delta CR$ for the mechanical compression ratio shown in FIG. 13 and the atmospheric pressure Pa. Note that in FIG. 17(A) as well, Po indicates the reference atmospheric pressure. As will be understood from FIG. 17(A), the correction amount ΔCR becomes negative and falls the lower the atmospheric pressure Pa from the reference atmospheric pressure Po, while increases the higher the atmospheric pressure Pa from the reference atmospheric pressure Po. That is, if the atmospheric pressure Pa falls from the reference atmospheric pressure Po, the mechanical compression ratio is reduced, while if the atmospheric pressure Pa rises from the reference atmospheric pressure Po, the mechanical compression ratio is increased.

On the other hand, if the atmospheric temperature becomes higher, the compression end temperature becomes higher along with this, so when the atmospheric temperature becomes higher, the mechanical compression ratio is preferably reduced. FIG. 17(B) shows the relationship between the correction amount ΔCR for the mechanical compression ratio and the atmospheric temperature Ta when considering this case. Note that in FIG. 17(B), To shows the reference atmospheric temperature. As will be understood from FIG. 17(B), the correction amount ΔCR becomes negative and falls the higher the atmospheric temperature Ta from the reference atmospheric temperature To and increases the lower the atmospheric temperature Ta from the reference atmospheric temperature To. That is, if the atmospheric temperature Ta becomes higher than the reference atmospheric temperature To, the mechanical compression ratio is lowered, while if the atmospheric temperature Ta falls below the reference atmospheric temperature To, the mechanical compression ratio is raised.

In this way, according to the present invention, the lower the atmospheric pressure Pa, the more the closing timing of the intake valve 7 is made to approach intake bottom dead center, while the lower the atmospheric pressure Pa or the higher the atmospheric temperature Ta, the more the mechanical compression ratio is lowered. Note that the correction amount ΔCR for the mechanical compression ratio is stored as a function of the atmospheric pressure Pa and atmospheric temperature Ta in the form of a map as shown in FIG. 17(C) in advance in the ROM 32.

Figure 14:
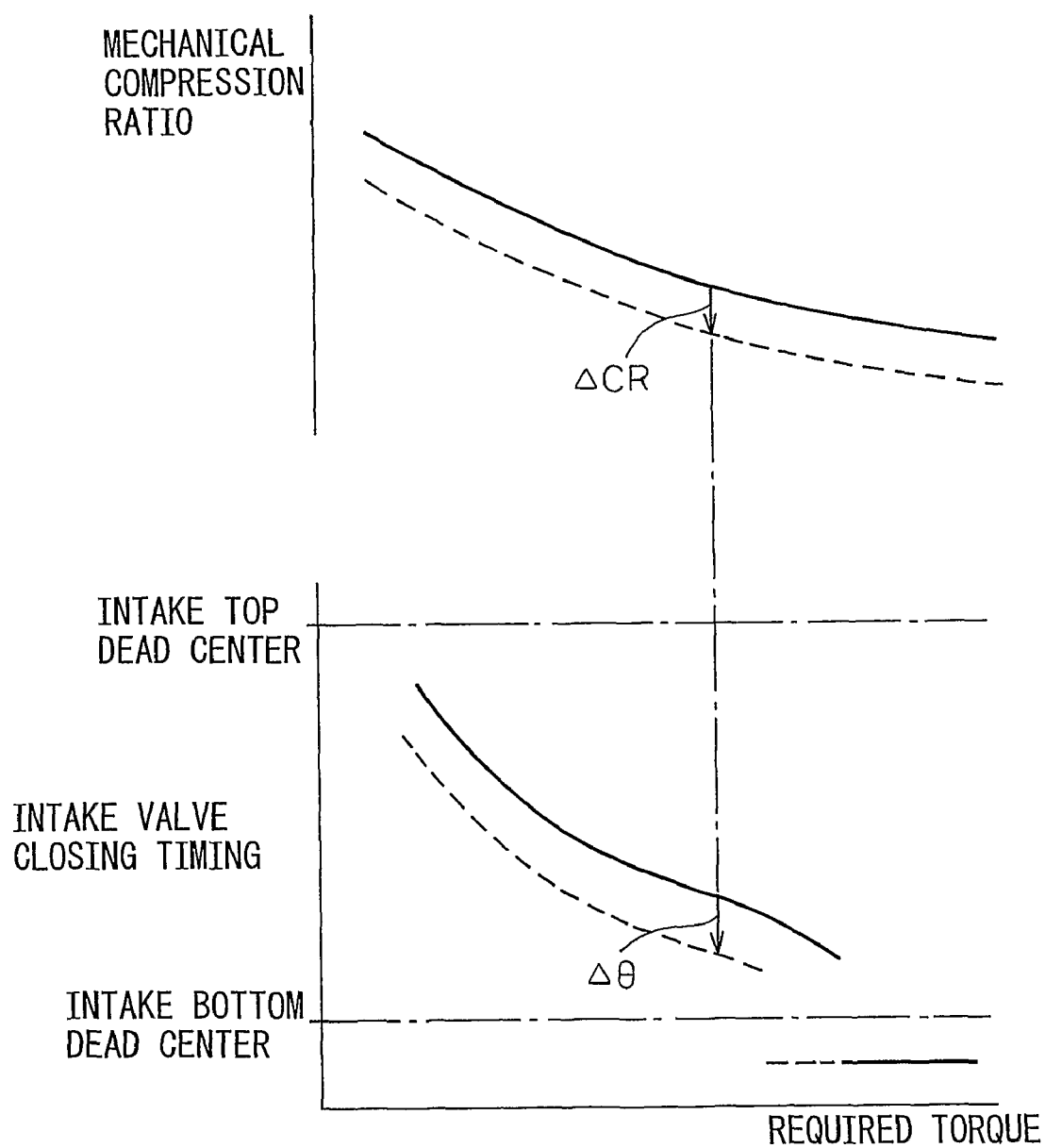
FIG. 14 is a view showing a mechanical compression ratio and a closing timing of the intake valve.

FIG. 14 shows the case, as shown by the broken line in FIG. 9, where the closing timing of the intake valve 7 is made before intake bottom dead center. In this case, if the atmospheric pressure falls, as shown in FIG. 14, the closing timing of the intake valve 7 is delayed by exactly the correction amount Δθ and the mechanical compression ratio is made to fall by exactly the correction amount ΔCR. The correction amount Δθ for the closing timing of the intake valve 7 in this case is reduced the lower the atmospheric pressure Pa as shown in FIG. 16(B). That is, the closing timing of the intake valve 7 is delayed the more the atmospheric pressure Pa falls.

Figure 18:
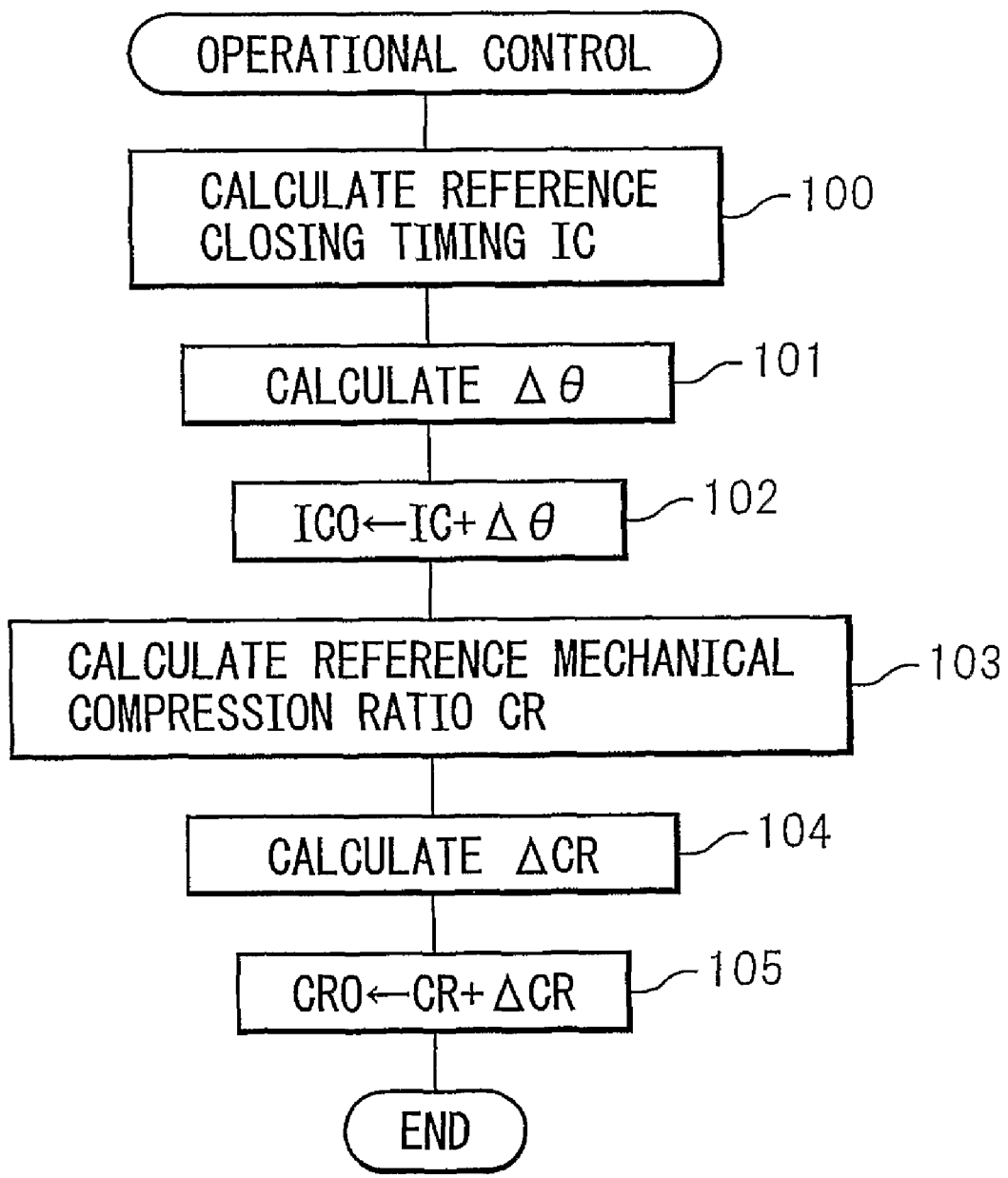
FIG. 18 is a flow chart for operational control.

FIG. 18 shows the operational control routine.

Referring to FIG. 18, first, at step 100, the reference closing timing IC of the intake valve 7 is calculated from the map shown in FIG. 15(A). Next, at step 101, the correction amount Δθ for the closing timing of the intake valve 7 is calculated from the relationship shown in FIG. 16(A) or FIG. 16(B). Next, at step 102, the reference closing timing IC is increased by the correction value Δθ to calculate the final closing timing ICO (=IC+Δθ) and the closing timing of the intake valve 7 is made this closing timing ICO. Next, at step 103, the reference mechanical compression ratio CR is calculated from the map shown in FIG. 15(C). Next, at step 104, the correction value ΔCR for the mechanical compression ratio is calculated from the map shown in FIG. 17(C). Next, at step 105, the reference mechanical compression ratio CR is increased by the correction value ΔCR to calculate the final mechanical compression ratio CRO(=CR+ΔCR) and the mechanical compression ratio is made this mechanical compression ratio CRO.

LIST OF REFERENCE NOTATIONS

1 . . . crank case
2 . . . cylinder block
3 . . . cylinder head
4 . . . piston
5 . . . combustion chamber
7 . . . intake valve
70 . . . intake valve drive cam shaft
A . . . variable compression ratio mechanism
B . . . Variable valve timing mechanism

The invention claimed is:

1. A spark ignition type internal combustion engine provided with
a variable timing mechanism able to control a closing timing of an intake valve and
a variable compression ratio mechanism able to change a mechanical compression ratio and controlling the closing timing of the intake valve to control the amount of intake air fed into a combustion chamber, wherein
the closing timing of the intake valve is caused to approach intake bottom dead center when the atmospheric pressure falls and
the mechanical compression ratio is reduced, when the atmospheric pressure falls or the atmospheric temperature rises, so that an output torque in accordance with a required torque is obtained even when the atmospheric pressure changes.

2. A spark ignition type internal combustion engine as set forth in claim 1, wherein
the closing timing of the intake valve is caused to approach intake bottom dead center more the lower the atmospheric pressure becomes and the mechanical compression ratio is reduced, the lower the atmospheric pressure becomes or the higher the atmospheric temperature becomes, so that an output torque in accordance with the required torque is obtained even when the atmospheric pressure changes.

3. A spark ignition type internal combustion engine as set forth in claim 1, wherein
a reference closing timing of the intake valve by which an output torque in accordance with the required torque is obtained when the atmospheric pressure is a predetermined reference atmospheric pressure is stored in advance, and
when the atmospheric pressure falls below said reference atmospheric pressure, the closing timing of the intake valve is made to approach intake bottom dead center from said reference closing timing by exactly a predetermined correction amount.

4. A spark ignition type internal combustion engine as set forth in claim 3, wherein the more the atmospheric pressure falls from said reference atmospheric pressure, the more said correction amount for the closing timing of the intake valve is increased.

5. A spark ignition type internal combustion engine as set forth in claim 1, wherein
a reference closing timing of the intake valve by which an output torque in accordance with the required torque is obtained when the atmospheric pressure is a predetermined reference atmospheric pressure is stored in advance, and
when the atmospheric pressure rises above said reference atmospheric pressure, the closing timing of the intake valve is made to separate from intake bottom dead center by exactly a predetermined correction amount with respect to said reference closing timing.

6. A spark ignition type internal combustion engine as set forth in claim 5, wherein the more the atmospheric pressure rises from said reference atmospheric pressure, the more said correction amount for the closing timing of the intake valve is increased.

7. A spark ignition type internal combustion engine as set forth in claim 1, wherein when the atmospheric pressure falls below a predetermined reference atmospheric pressure, the mechanical compression ratio is reduced by exactly a predetermined correction amount from a reference mechanical compression ratio under said reference atmospheric pressure.

8. A spark ignition type internal combustion engine as set forth in claim 7, wherein the more the atmospheric pressure falls from said reference atmospheric pressure, the more said correction amount for the mechanical compression ratio is increased.

9. A spark ignition type internal combustion engine as set forth in claim 1, wherein when the atmospheric pressure rises above a predetermined reference atmospheric pressure, the mechanical compression ratio is increased by exactly a predetermined correction amount from a reference mechanical compression ratio under said reference atmospheric pressure.

10. A spark ignition type internal combustion engine as set forth in claim 9, wherein the more the atmospheric pressure rises from said reference atmospheric pressure, the more said correction amount for the mechanical compression ratio is increased.

11. A spark ignition type internal combustion engine as set forth in claim 1, wherein when the atmospheric temperature rises from a predetermined reference atmospheric temperature, the mechanical compression ratio is decreased by exactly a predetermined correction amount from a reference mechanical compression ratio under said reference atmospheric temperature.

12. A spark ignition type internal combustion engine as set forth in claim 11, wherein the more the atmospheric temperature rises from said reference atmospheric temperature, the more said correction amount for the mechanical compression ratio is increased.

13. A spark ignition type internal combustion engine as set forth in claim 1, wherein when the atmospheric temperature falls from a predetermined reference atmospheric temperature, the mechanical compression ratio is increased by exactly a predetermined correction amount from a reference mechanical compression ratio under said reference atmospheric temperature.

14. A spark ignition type internal combustion engine as set forth in claim 13, wherein the more the atmospheric temperature falls from said reference atmospheric temperature, the more said correction amount for the mechanical compression ratio is increased.

15. A spark ignition type internal combustion engine as set forth in claim 1, wherein the mechanical compression ratio is reduced to reduce the compression end pressure so as to reduce the compression end temperature when the closing timing of the intake valve is caused to approach intake bottom dead center so that an output torque in accordance with the required torque is obtained even when the atmospheric pressure falls.

16. A spark ignition type internal combustion engine as set forth in claim 15, wherein when making the closing timing of the intake valve approach intake bottom dead center, if the compression end temperature and compression end pressure exceed an allowable limit value where normal combustion is performed, the mechanical compression ratio is reduced until a mechanical compression ratio where the compression end temperature and compression end pressure become said allowable limit value.

17. A spark ignition type internal combustion engine as set forth in claim 1, wherein the closing timing of the intake valve is made to shift in a direction away from intake bottom dead center until a limit closing timing able to control the amount of intake air fed into the combustion chamber as the required torque becomes lower.

18. A spark ignition type internal combustion engine as set forth in claim 17, wherein in the region of a required torque lower than the required torque when the closing timing of the intake valve reaches said limit closing timing, a throttle valve arranged in an engine intake passage is used to control the amount of intake air fed into the combustion chamber.

19. A spark ignition type internal combustion engine as set forth in claim 17, wherein in the region of a required torque lower than the required torque when the closing timing of the intake valve reaches said limit closing timing, the lower the required torque, the larger the air-fuel ratio is made.

* * * * *